US 9,985,490 B2

(12) United States Patent
Owen

(10) Patent No.: US 9,985,490 B2
(45) Date of Patent: May 29, 2018

(54) ELECTRIC MOTOR OR GENERATOR

(71) Applicant: PROTEAN ELECTRIC LIMITED, Surrey (GB)

(72) Inventor: Geoffrey Owen, Surrey (GB)

(73) Assignee: PROTEAN ELECTRIC LIMITED (GB)

( * ) Notice: Subject to any disclaimer, the term of this patent is extended or adjusted under 35 U.S.C. 154(b) by 583 days.

(21) Appl. No.: 14/426,751

(22) PCT Filed: Sep. 9, 2013

(86) PCT No.: PCT/IB2013/058408
§ 371 (c)(1),
(2) Date: Mar. 8, 2015

(87) PCT Pub. No.: WO2014/037920
PCT Pub. Date: Mar. 13, 2014

(65) Prior Publication Data
US 2015/0249371 A1 Sep. 3, 2015

(30) Foreign Application Priority Data

Sep. 10, 2012 (GB) .................................. 1216099.0

(51) Int. Cl.
*H02K 3/28* (2006.01)
*H01G 4/38* (2006.01)
(Continued)

(52) U.S. Cl.
CPC .............. *H02K 3/28* (2013.01); *H01G 4/248* (2013.01); *H01G 4/38* (2013.01); *H02K 3/30* (2013.01);
(Continued)

(58) Field of Classification Search
CPC ........ H02K 3/28; H02K 3/30; H02K 11/0094; H02K 11/33
See application file for complete search history.

(56) References Cited

U.S. PATENT DOCUMENTS 3,011,083 A * 11/1961 Jacob ....................... H01G 4/32
310/72
5,491,370 A 2/1996 Schneider et al.
(Continued)

FOREIGN PATENT DOCUMENTS

DE 2641182 A1 3/1978
DE 102008044036 A1 5/2010
(Continued)

OTHER PUBLICATIONS

European Patent Office; International Search Report; WIPO; dated Jan. 22, 2015; 4; UK.
(Continued)

*Primary Examiner* — Dang Le
(74) *Attorney, Agent, or Firm* — Valerie M. Davis; The Mason Group Patent Specialists LLC

(57) ABSTRACT

An electric motor or generator having a stator having two coil sets arranged to produce a magnetic field for generating a drive torque; two control devices; and a first capacitor arranged to be coupled to a power source for providing current to the two control devices, wherein the first control device is coupled to a first coil set and the first capacitor and the second control device is coupled to a second coil set and the first capacitor, wherein each control device is arranged to control current in the respective coil set to generate a magnetic field in the respective coil set.

24 Claims, 16 Drawing Sheets

(51) Int. Cl.
  *H01G 4/248*  (2006.01)
  *H02K 11/00*  (2016.01)
  *H02K 3/30*   (2006.01)
  *H02K 11/33*  (2016.01)

(52) U.S. Cl.
  CPC ......... *H02K 11/0094* (2013.01); *H02K 11/33* (2016.01); *Y02T 10/7022* (2013.01)

(56) References Cited

U.S. PATENT DOCUMENTS

| | | | |
|---|---|---|---|
| 8,049,383 B2 * | 11/2011 | Nakajima | H02K 1/02 310/67 R |
| 8,604,730 B2 * | 12/2013 | Suzuki | H02M 1/14 318/400.02 |
| 2007/0284157 A1 | 12/2007 | Heller et al. | |
| 2015/0249371 A1 * | 9/2015 | Owen | H01G 4/38 310/71 |

FOREIGN PATENT DOCUMENTS

| | | |
|---|---|---|
| EP | 1418660 A1 | 5/2004 |
| WO | 2012010993 A2 | 1/2012 |

OTHER PUBLICATIONS

European Patent Office; Written Opinion of the International Searching Authority; dated Mar. 10, 2015; World Intellectual Property Organization; Munich.

* cited by examiner

ELECTRIC MOTOR OR GENERATOR

The present invention relates to an electric motor or generator, in particular an electric motor or generator having a capacitor.

Electric motor systems typically include an electric motor and a control unit arranged to control the power of the electric motor. Examples of known types of electric motor include the induction motor, synchronous brushless permanent magnet motor, switched reluctance motor and linear motor. In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

By way of illustration, FIG. 1 shows a typical three phase electric motor 10 having three coil sets 14, 16, 18. Each coil set consists of four coil sub-sets that are connected in series, where for a given coil set the magnetic field generated by the respective coil sub-sets will have a common phase.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

A three phase bridge inverter includes a number of switching devices, for example power electronic switches such as Insulated Gate Bipolar Transistor (IGBT) switches, which are used to generate an alternating voltage from a DC voltage supply.

To reduce the effects of inductance on inverters when switching current, capacitors are used as a local voltage source for electric motor inverters. By placing a capacitor close to an inverter the inductance associated with the voltage source is minimised.

Accordingly, where there is a need for reduced inductance, typically an electric motor that comprises a plurality of sub-motors each with a respective inverter will have separate capacitors associated with each inverter, where the additional capacitors result in an increased space envelope requirement and increase in cost, with a potential reduction in reliability.

It is desirable to improve this situation

In accordance with an aspect of the present invention there is provided an electric motor or generator according to the accompanying claims.

As a result of a plurality of inverters drawing different amounts of current at any given time, by using a single capacitor to support the plurality of inverters the present invention provides the advantage of reducing the overall capacitance requirements for an electric motor with a corresponding reduction in space. Additionally a single annular capacitor allows the capacitor to be mounted close to the plurality of separate inverters, thereby reducing inductive effects and removing the need for snubber capacitors.

The present invention will now be described, by way of example, with reference to the accompanying drawings, in which.

The embodiment of the invention described is for an electric motor having a capacitor element, where the electric motor is for use in a wheel of a vehicle. However the electric motor may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
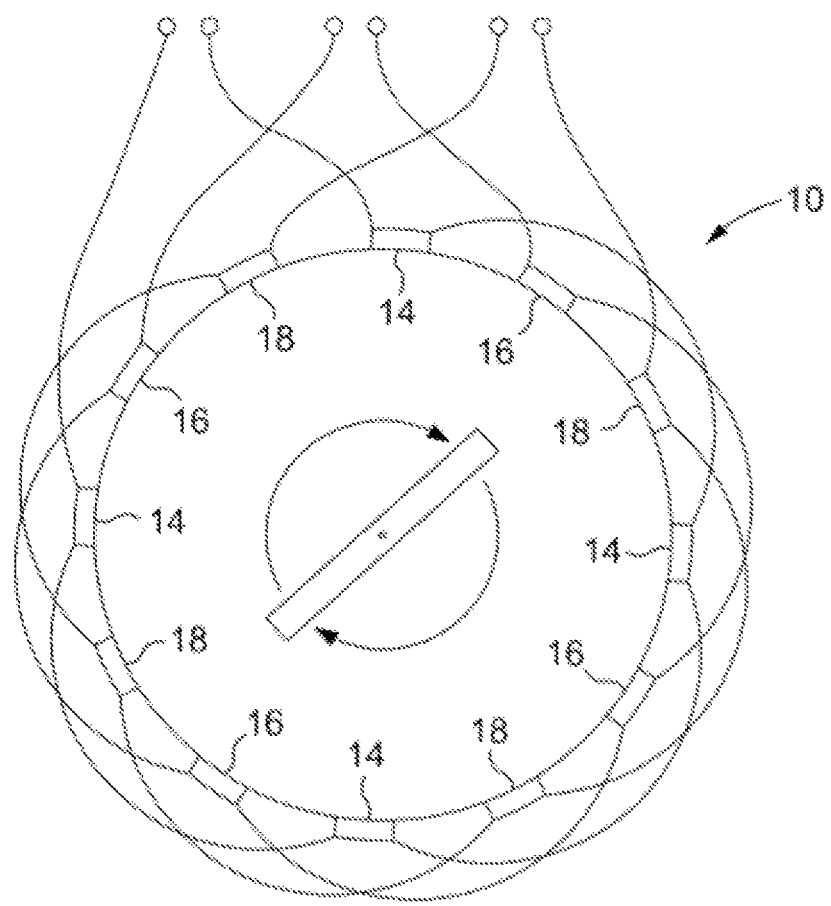
FIG. 1 illustrates a prior art three phase electric motor.
Figure 2:
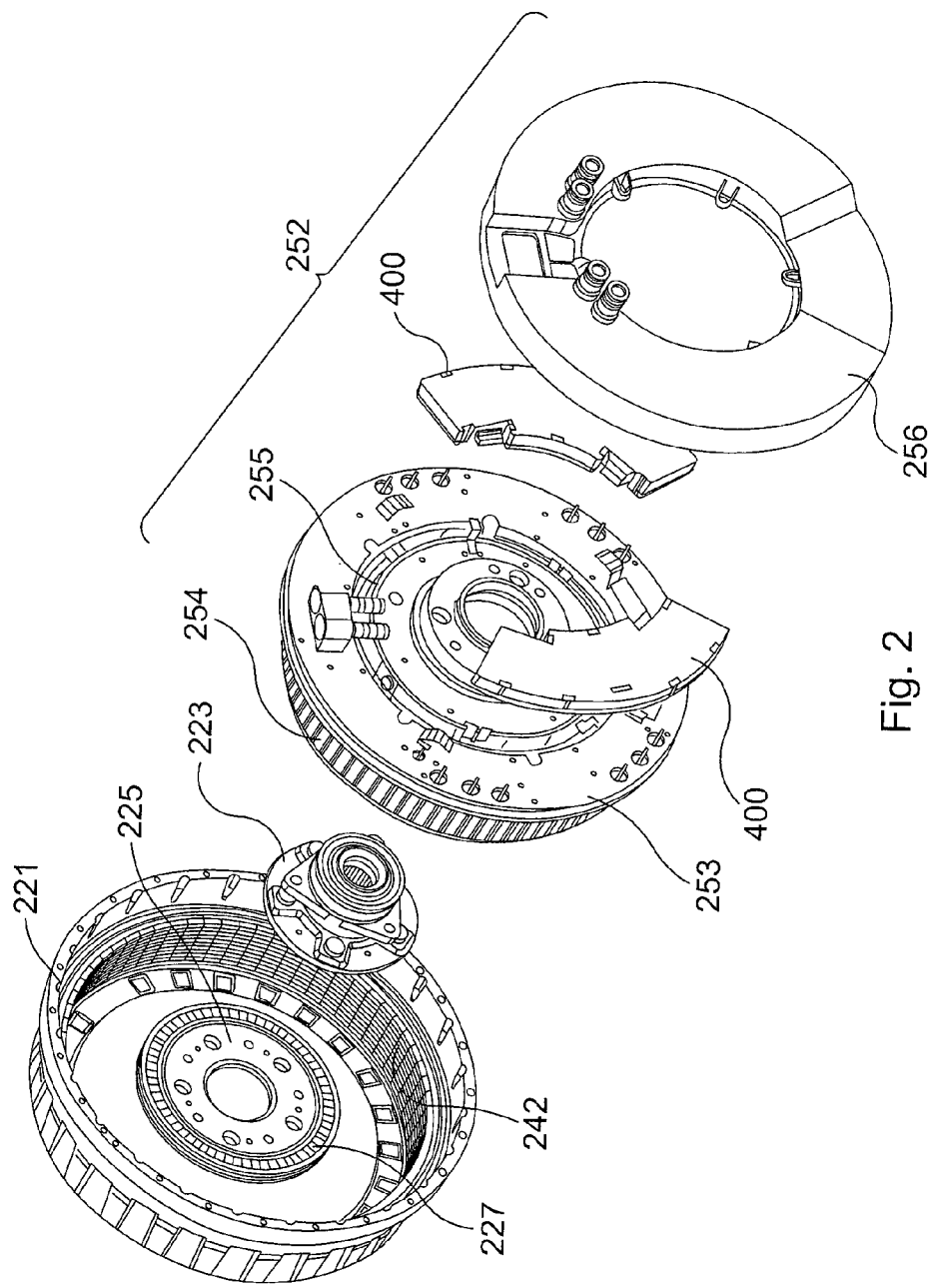
FIG. 2 illustrates an exploded view of a motor embodying the present invention.
Figure 3:
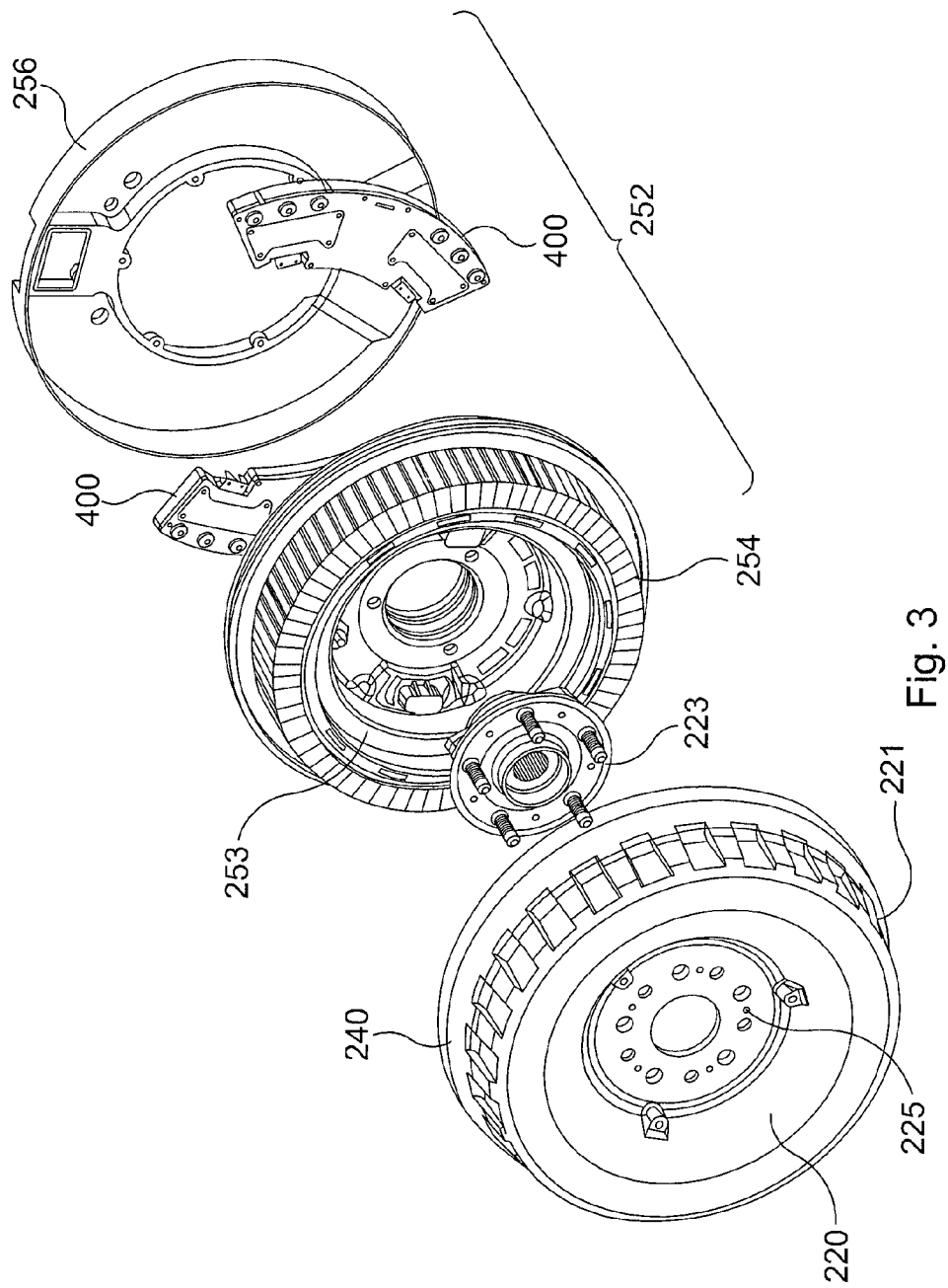
FIG. 3 illustrates an exploded view of the electric motor shown in FIG. 1 from an alternative angle.

For the purposes of the present embodiment, as illustrated in FIG. 2 and FIG. 3, the in-wheel electric motor includes a stator 252 comprising a heat sink 253, multiple coils 254, two control modules 400 mounted on the heat sink 253 on a rear portion of the stator for driving the coils, and a capacitor (not shown) mounted on the stator within a recess 255 formed on the rear portion of the stator. In a preferred embodiment the capacitor is an annular capacitor element. The coils 254 are formed on stator tooth laminations to form coil windings, where the stator tooth laminations are mounted on the heat sink 253. The heat sink 253 includes at least one cooling channel for allowing a coolant to flow within the heat sink 253 for providing cooling, thereby allowing the heat sink 253 to extract heat from components attached to the heat sink 253, for example the coil windings and the control modules. A stator cover 256 is mounted on the rear portion of the stator 252, enclosing the control modules 400 to form the stator 252, which may then be fixed to a vehicle and does not rotate relative to the vehicle during use.

Figure 5:
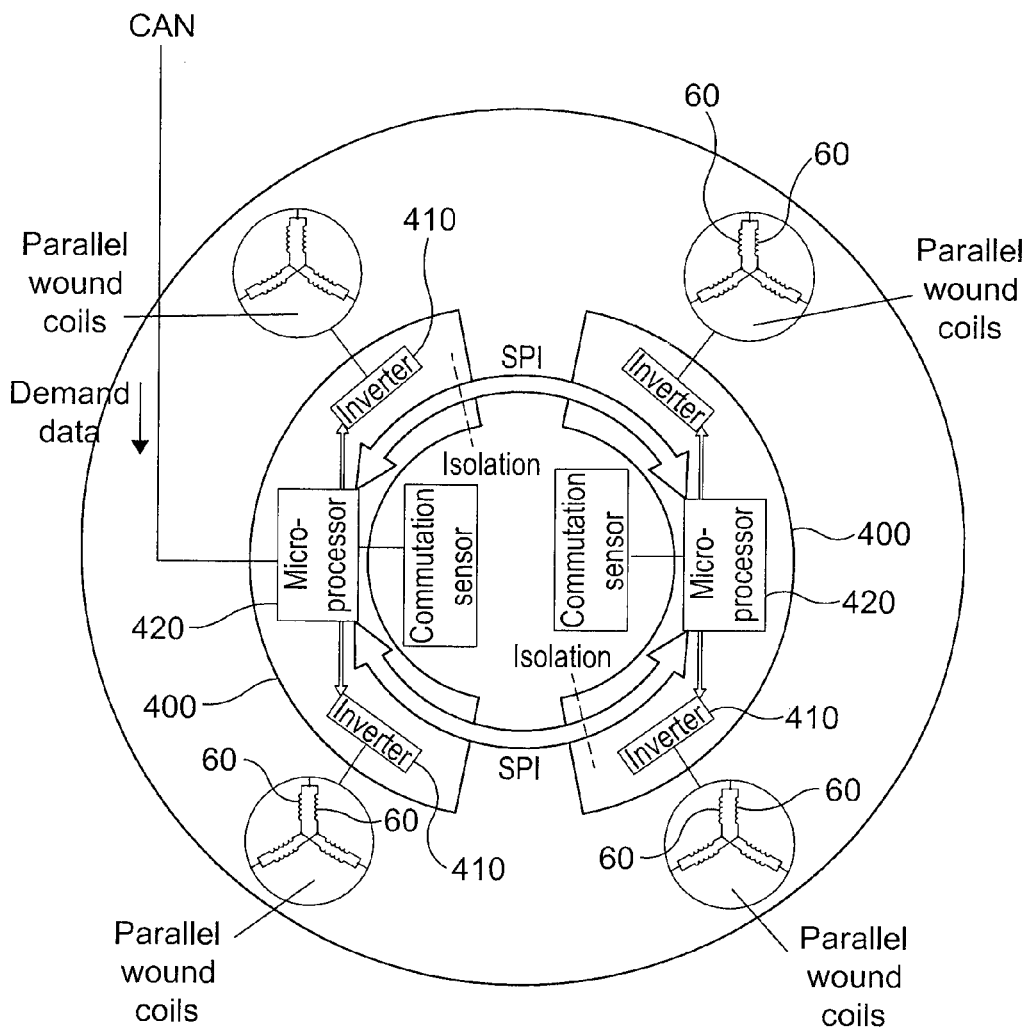
FIG. 5 illustrates control modules for an electric motor according to an embodiment of the present invention.

Each control module 400 includes two inverters 410 and control logic 420, which in the present embodiment includes a processor, for controlling the operation of the inverters 410, which is schematically represented in FIG. 5.

The annular capacitor element is coupled across the inverters 410 for distributing the DC power supply to the inverters 410 and for reducing voltage ripple on the electric motor's power supply line, otherwise known as the DC busbar, during operation of the electric motor, as described below. For reduced inductance the annular capacitor element is mounted adjacent to the control modules 400. Although the capacitor element within the electric motor of the present embodiment is an annular capacitor, the capacitor element may be of any shape.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 3 shows an exploded view of the same motor assembly illustrated in FIG. 2 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improved position detection, preferably the sensor includes an associated second sensor placed 90 electrical degrees displaced from the first sensor.

Figure 4:
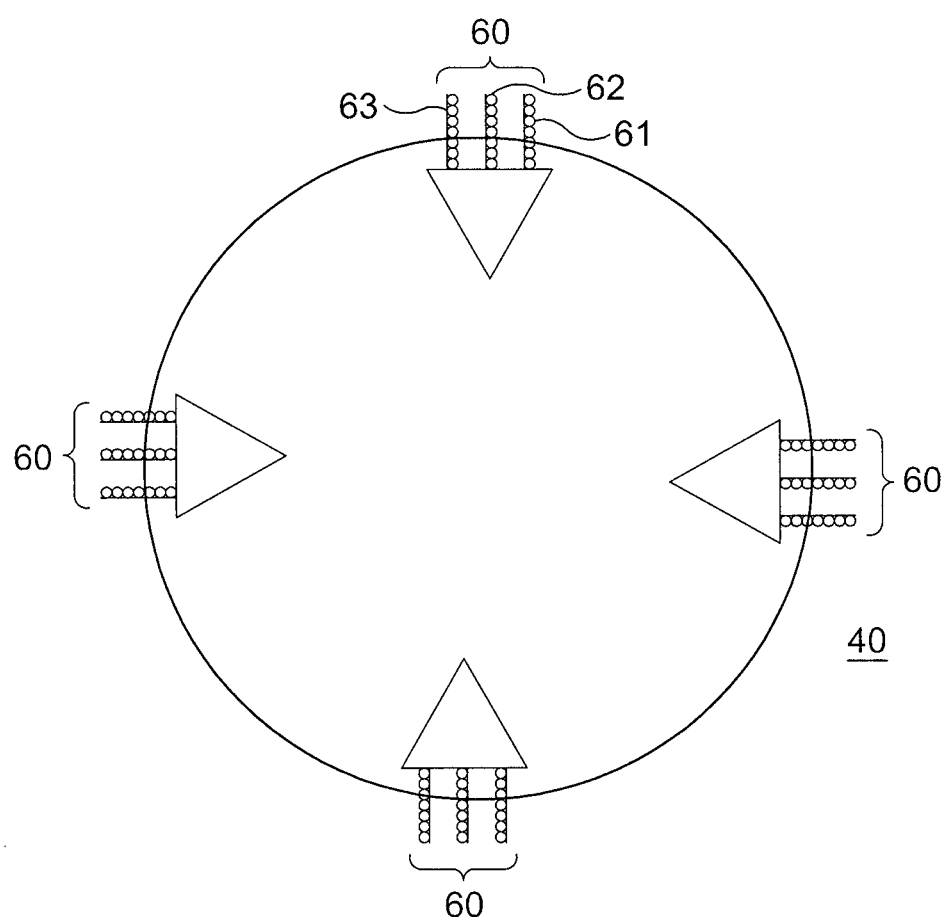
FIG. 4 illustrates an electric motor according to an embodiment of the present invention.

As illustrated in FIG. 4, in the present embodiment the electric motor includes four coil sets 60 with each coil set 60 having three coil sub-sets 61, 62, 63 that are coupled in a wye configuration to form a three phase sub-motor, resulting in the motor having four three phase sub-motors. The operation of the respective sub-motors is controlled via one of two control devices/control modules 400, as described below. However, although the present embodiment describes an electric motor having four coil sets 60 (i.e. four sub motors) the motor may equally have one or more coil sets with associated control devices. In a preferred embodiment the motor 40 includes eight coil sets 60 with each coil set 60 having three coil sub-sets 61, 62, 63 that are coupled in a wye configuration to form a three phase sub-motor, resulting in the motor having eight three phase sub-motors. Similarly, each coil set may have any number of coil sub-sets, thereby allowing each sub-motor to have two or more phases.

FIG. 5 illustrates the connections between the respective coil sets 60 and the control modules 400, where a respective coil set 60 is connected to a respective three phase inverter 410 included in a control module 400. As is well known to a person skilled in the art, a three phase inverter contains six switches, where a three phase alternating voltage may be generated by the controlled operation of the six switches. However, the number of switches will depend upon the number of voltage phases to be applied to the respective sub motors, where the sub motors can be constructed to have any number of phases.

Figure 6:
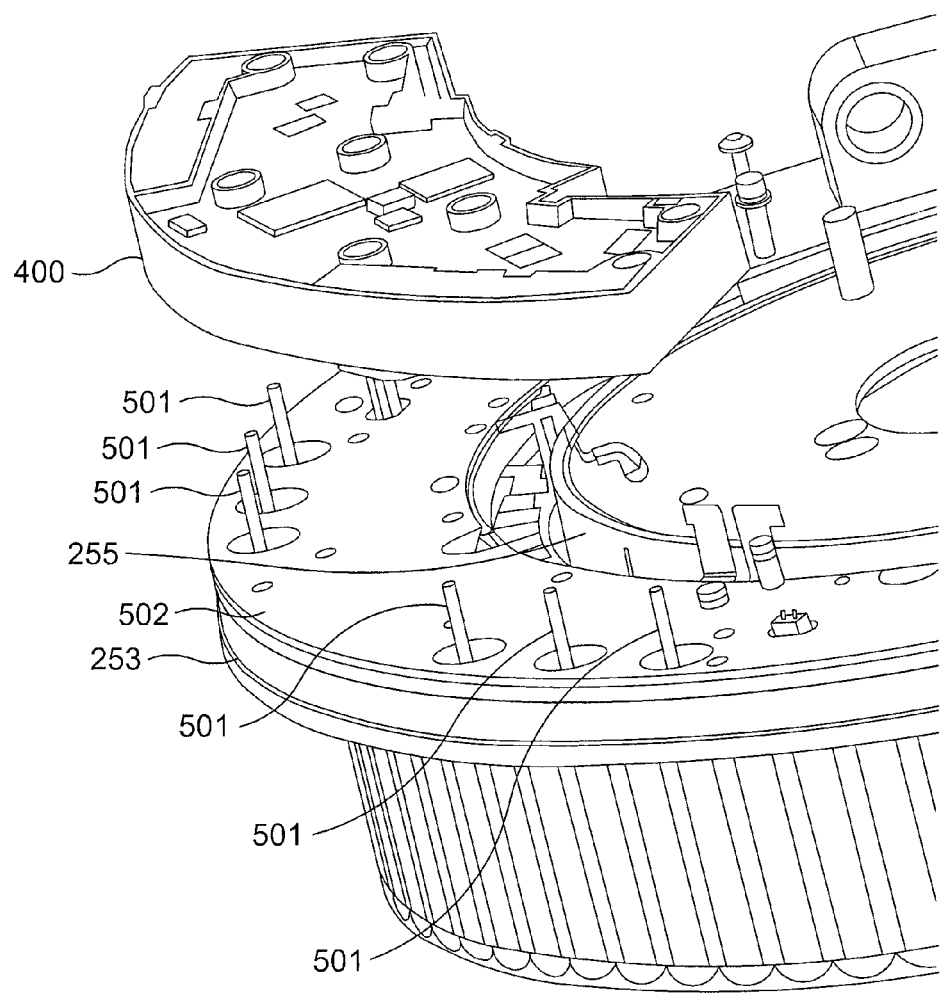
FIG. 6 illustrates a partial view for an electric motor according to an embodiment of the present invention.

The respective coils of the four coil sets are wound on individual stator teeth, which form part of the stator. The end portions 501 of the coil windings protrude through the planar rear portion 502 of the stator heat sink, as illustrated in FIG. 6. FIG. 6 illustrates a partial perspective view of the stator, where the end portions 501 of the coil windings for two of the four coil sets 60 extend away from the planar portion of the stator heat sink 253.

The control modules 400 are positioned adjacent to the planar portion of the stator heat sink 253, for mounting to the planar portion of the stator heat sink 253. For illustration purposes, a view of a single control module 400 separated from the stator heat sink 253 is shown in FIG. 6. As stated above, an annular recess 255 is formed in the planar portion of the heat sink 253 for housing the annular capacitor element.

For the purposes of the present embodiment, the planar portion of the heat sink 253 is located on the side of the stator that is intended to be mounted to a vehicle.

Preferably, to facilitate the mounting of the respective control modules 400 to the stator heat sink 253, the end sections 501 of the coil windings for the respective coil sets are arranged to extend away from the heat sink portion of the stator in a substantially perpendicular direction relative to the surface of the heat sink portion of the stator.

Figure 7:
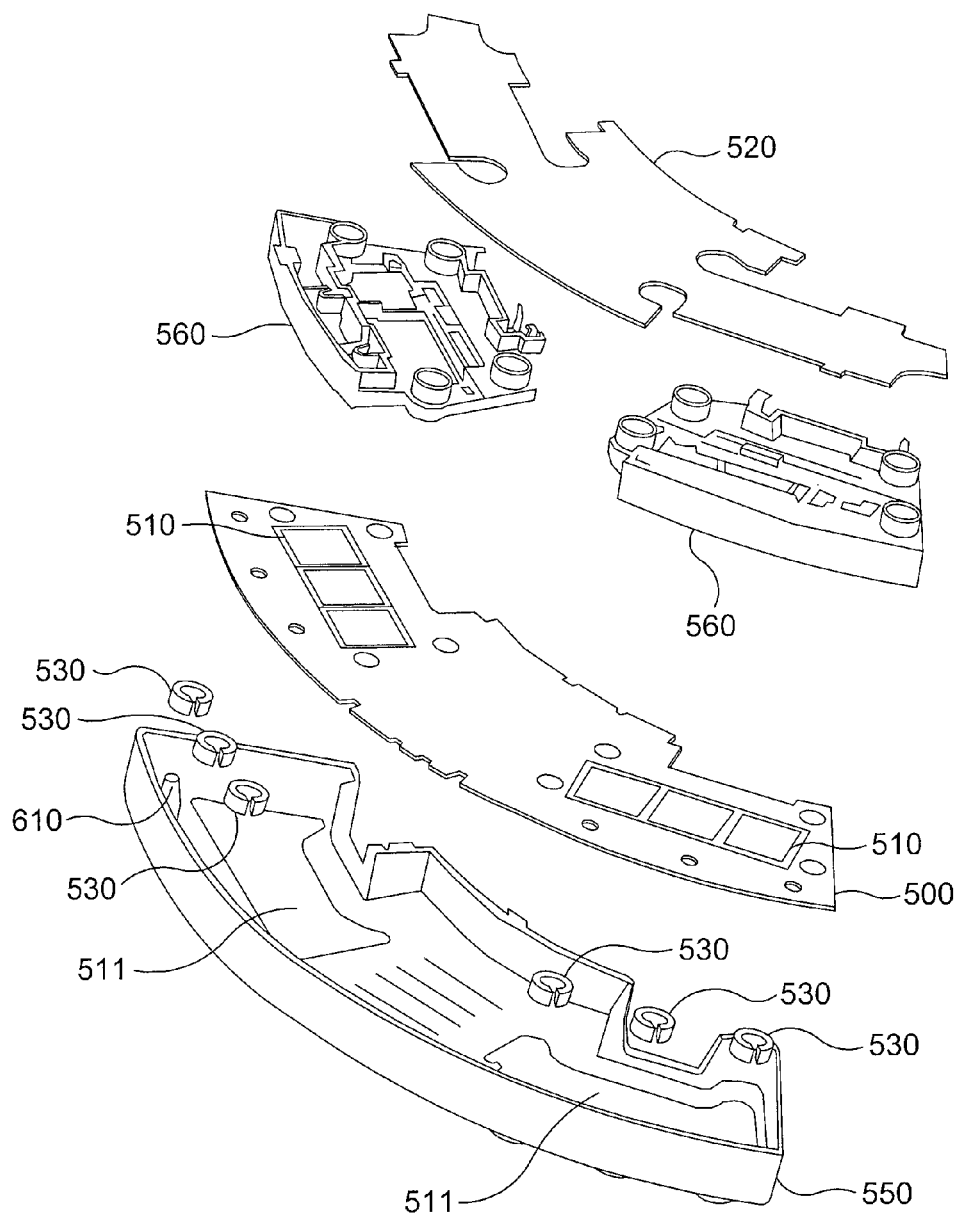
FIG. 7 illustrates a control module for an electric motor according to an embodiment of the present invention.

FIG. 7 illustrates a modular construction of the control module 400 with an exploded view of a preferred embodiment of a control module 400, where each control module 400, otherwise known as a power module, includes a power printed circuit board 500 in which are mounted two power substrate assemblies 510, a control printed circuit board 520, four power source busbars (not shown) for connecting to the annular capacitor element, six phase winding busbars (not shown) for connecting to respective coil windings, two insert modules 560 and six current sensors. Each current sensor includes a Hall sensor and a section of soft ferromagnetic material 530 arranged to be mounted adjacent to the Hall sensor, where preferably each Hall sensor is arranged to be mounted in a cutout section of a piece of soft ferromagnetic material fashioned in a toroid shape.

Each of the control module components are mounted within a control module housing 550 with the four power source busbars and the six phase winding busbars being mounted, via the respective insert modules, on the power printed circuit board 500 on opposite sides of the control device housing 550.

Each power substrate 510 is arranged to be mounted in a respective aperture formed in the power printed circuit board 500, where each of the power substrates 510 has a 3 mm copper base plate 600 upon which is formed a three phase inverter 410. A corresponding aperture 511 is also formed in the control module housing 550 to allow the copper base plate for each of the power substrates 510 is placed in direct contact with the stator heat sink 253 when the control device housing 550 is mounted to the stator, thereby allowing for cooling to be applied directly to the base of each of the power substrates 510.

Mounted on the underside of the power printed circuit board 500, adjacent to the copper base plate of the power substrate assemblies 510, are the six Hall sensors (not shown) for measuring the current in the respective coil windings associated with two of the four coil sets. The Hall sensor readings are provided to the control printed circuit board 520.

The power printed circuit board 500 includes a variety of other components that include drivers for the inverter switches formed on the power substrate assemblies 510, where the drivers are used to convert control signals from the control printed circuit board 520 into a suitable form for operating switches mounted on the power printed circuit board 500, however these components will not be discussed in any further detail.

The insert modules 560 are arranged to be mounted over the power printed circuit board 500 when the power printed circuit board 500 is mounted in the control module housing 550.

Each insert module 560 is arranged to be mounted over a respective power substrate assembly 510 mounted on the power printed circuit board 500, with each insert module 560 having an aperture arranged to extend around inverter switches formed on a respective power substrate assembly 510.

Each insert module 560 is arranged to carry two power source busbars and three phase windings busbars for coupling the inverter formed on the power substrate assembly 510, over which the insert module 560 is mounted, to the annular capacitor element and to the phase windings of a coil set, respectively.

The insert module 560 also acts as a spacer for separating the control printed circuit board 520 from the power printed circuit board 500 when both the power printed circuit board 500 and the control printed circuit board 520 are mounted in the control module housing 550.

A first pair of the power source busbars mounted on one of the insert modules 560 is for providing a voltage source to a first inverter 410 formed on one of the power substrates assemblies 510. A second pair of the power source busbars mounted on a second insert module 560 is for providing a voltage source to a second inverter 410 formed on the other power substrate assembly 510.

For each pair of power source busbars, one of the power source busbars is located in a first plane formed above the plane of the power circuit board 500. The other power source busbar is located in a second plane above the first plane. Preferably, each pair of power source busbars are arranged to be substantially co-planar.

Located in the control module housing 550 on the opposite side of the respective power substrate assemblies 510 to the power source busbars are the six phase winding busbars. A phase winding busbar is coupled to each inverter leg for coupling to a respective coil winding, as is well known to a person skilled in the art (i.e. a phase winding busbar is coupled to each leg of the three phase inverter formed on one of the power substrate assemblies 510 and a phase winding busbar is coupled to each leg of the three phase inverter formed on the other power substrate assembly 510).

The control printed circuit board 520 is arranged to be mounted in the control module housing 550 above the power printed circuit board 500.

The control printed circuit board 520 includes a processor 420 for controlling the operation of the respective inverter switches to allow each of the electric motor coil sets 60 to be supplied with a three phase voltage supply using PWM voltage control across the respective coil sub-sets 61, 62, 63. For a given torque requirement, the three phase voltage applied across the respective coil sets is determined using field oriented control FOC, which is performed by the processor on the control printed circuit board using the current sensors mounted within the control module housing 550 for measuring the generated current.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

The inverter switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and form a leg of the three phase bridge circuit. A DC power source is coupled across the legs of the inverter, with the respective coil windings of an electric motor being coupled between a respective pair of switches, as is well known to a person skilled in the art. A single phase inverter will have two pairs of switches arranged in series to form two legs of an inverter.

The three phase voltage supply results in the generation of current flow in the respective coil sub-sets and a corresponding rotating magnetic field for providing a required torque by the respective sub-motors.

Additionally, each control printed circuit board 520 includes an interface arrangement to allow communication between the respective control modules 400 via a communication bus with one control module 400 being arranged to communicate with a vehicle controller mounted external to the electric motor, where the externally mounted controller will typically provide a required torque value to the control module 400. The processor 420 on each control modules 400 is arranged to handle communication over the interface arrangement.

As stated above, although the present embodiment describes each coil set 60 as having three coil sub-sets 61, 62, 63, the present invention is not limited by this and it would be appreciated that each coil set 60 may have one or more coil sub-sets.

Figure 8:
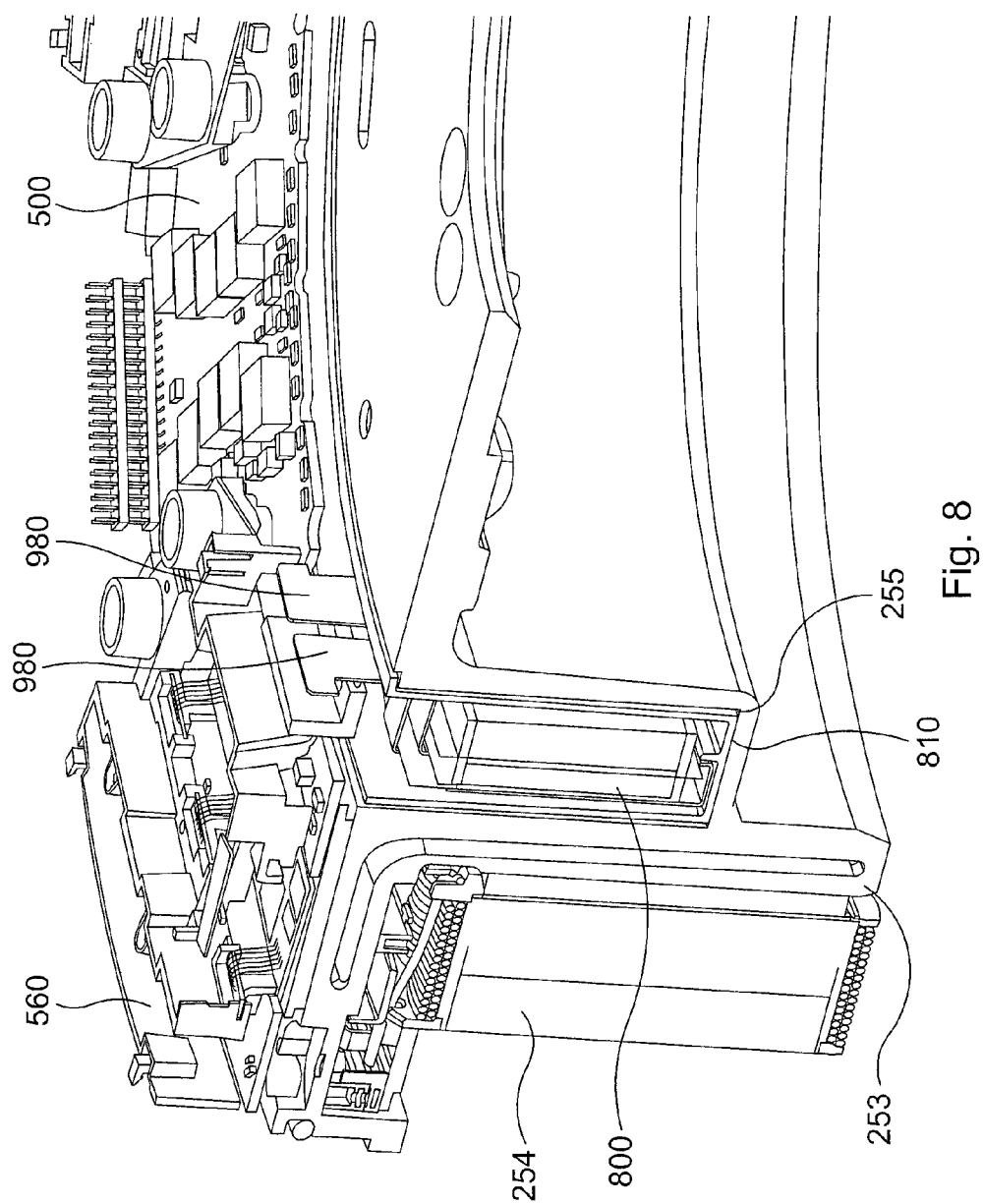
FIG. 8 illustrates a cross sectional view of a stator according to an embodiment of the present invention.

FIG. 8 illustrates a cross sectional view of a section of the stator with the annular capacitor element 800 being housed within a capacitor element housing 810 mounted within the annular recess 255 formed in the planar portion of the heat sink 253.

The annular capacitor element 800 includes a first busbar, where the first busbar is coupled to a first internal capacitor electrode via a first external electrode. A second busbar mounted adjacent to the first busbar is coupled to a second internal capacitor electrode via a second external electrode, as described below. The first busbar allows charge to flow to and from the first internal capacitor electrode. The second busbar allows charge to flow to and from the second internal capacitor electrode. The first internal capacitor electrode and the second internal capacitor electrode correspond to the capacitor plates.

Figure 9:
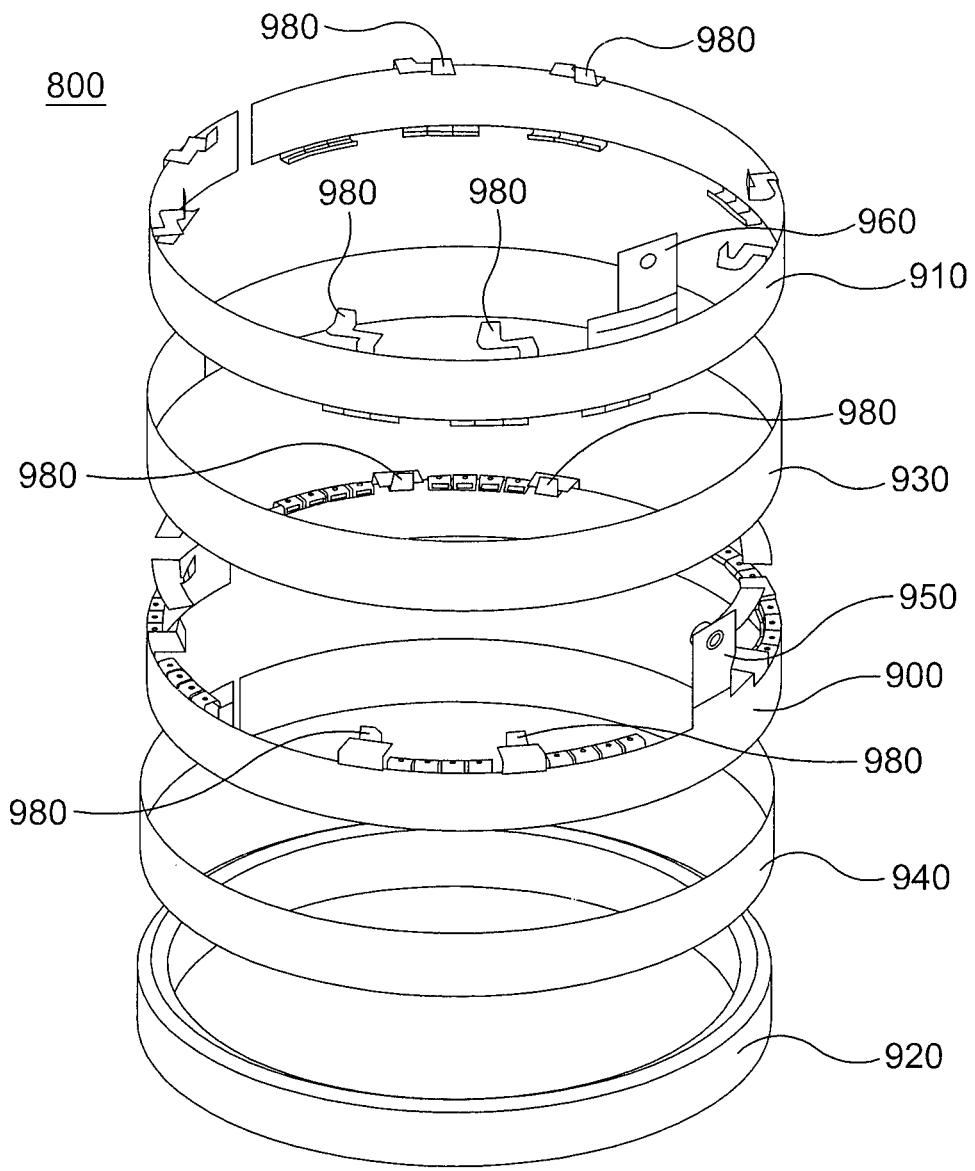
FIG. 9 illustrates a capacitor element according to an embodiment of the present invention.

FIG. 9 illustrates an exploded view of the annular capacitor element 800, where both the first busbar 900 and the second busbar 910 are mounted around the outer circumferential surface of an annular capacitor component 920 with the first busbar 900 and the second busbar 910 being separated by a first insulating film 930. The first busbar 900 is electrically isolated from the outer circumference of the annular capacitor component 920 with a second insulating film 940.

Having concentric busbars 900, 910 formed around the annular capacitor component, where the busbars 900, 910 are separated by a thin insulation layer 930, rather than being placed on separate sides of a capacitor element, minimises the inductance, thereby reducing losses in the inverter.

The first busbar 900 includes a first electrical coupling element 950 for coupling the first busbar 900 to a first terminal of a DC power source, for example a battery located within the vehicle housing the in-wheel electric motor. Similarly, the second busbar 910 includes a second electrical coupling element 960 for coupling the second busbar to a second terminal of the DC power source, thereby allowing the annular capacitor element to be coupled in parallel between the DC power source and the respective inverters mounted in the in-wheel electric motor.

Additionally, the first busbar and the second busbar include coupling members 980 for coupling to the respective inverter power source busbars mounted in the control modules to allow the annular capacitor element 800 to act as a voltage source to each of the corresponding inverters, thereby allowing a single capacitor to be used to support a plurality of inverters.

In one embodiment, the first busbar 900 and the second busbar 910 may be prefabricated annular components that are push fit onto the annular capacitor component 920 so that the busbars 900, 910 are concentric. However, to minimise the dimensional tolerances of the busbars 900, 910 and the risk of damage to the capacitor assembly that could result from thermal expansion, preferably at least one of the busbars 900, 910 are manufactured as C shapes, where a section 970 of each of the busbars 900, 910 is removed to allow for variations in the diameter of the annular capacitor component 920 resulting from manufacture and/or thermal expansion. Similarly, having a gap in the first busbar 900 and the second busbar 910 allows the busbars to expand/contract without causing stress to the surrounding components. The gap that is formed in the first busbar 900 and the second busbar 910 to form the C shaped busbars may be of any suitable size, however preferably the size of the gap will calculated using the coefficient of thermal expansion values of the materials used for the busbars and engineering manufacturing tolerances and component size to determine a gap size that will avoid the ends of the busbars coming into contact over the thermal envelope of the electric motor.

As described below, preferably the annular capacitor component 920 combines a plurality of capacitors into a single capacitor element, where the annular capacitor component 920 includes a first capacitor, a second capacitor and a third capacitor.

The first capacitor is arranged to couple the DC voltage source to the respective inverters mounted in the control modules 400 on the electric motor, where the first capacitor is arranged to inhibit voltage transients generated across the inverter switches, which could cause losses and electrical stress on the switching devices and provide high pulse current loads from the inverter. This has the effect of reducing inductance on the inverters during current switching. The first capacitor element is coupled in parallel between the DC voltage source and the respective inverters.

To reduce electro-magnetic noise generated by the inverters, the annular capacitor component 920 also includes integrated second and third capacitors that are connected in line with the first capacitor. The second and third capacitors act as Y capacitor elements and are coupled in series with each other and in parallel with the first capacitor. Although the second and third capacitors are integrated with the first capacitor to form an annular capacitor element, the second and third capacitors may also be formed as separate elements to the first capacitor.

Y capacitors act as part of an EMC solution within an electric motor system, where Y capacitors are used in combination with a local DC link capacitor (i.e. the first capacitor) to reduce/control electromagnetic emissions by providing a path for common mode EMC currents to flow back to the DC link, thereby reducing the EMC currents flowing out of the motor.

For an electric motor having a plurality of sub-motors with associated inverters, typically two Y capacitors are required for each inverter. For a multi-inverter configuration this can have an adverse impact on packaging, cost and reliability of an electric motor system. However, the present invention allows a single Y capacitor configuration to support multiple inverters, thereby reducing packaging requirements and simplifying the manufacturing process.

Figure 10:
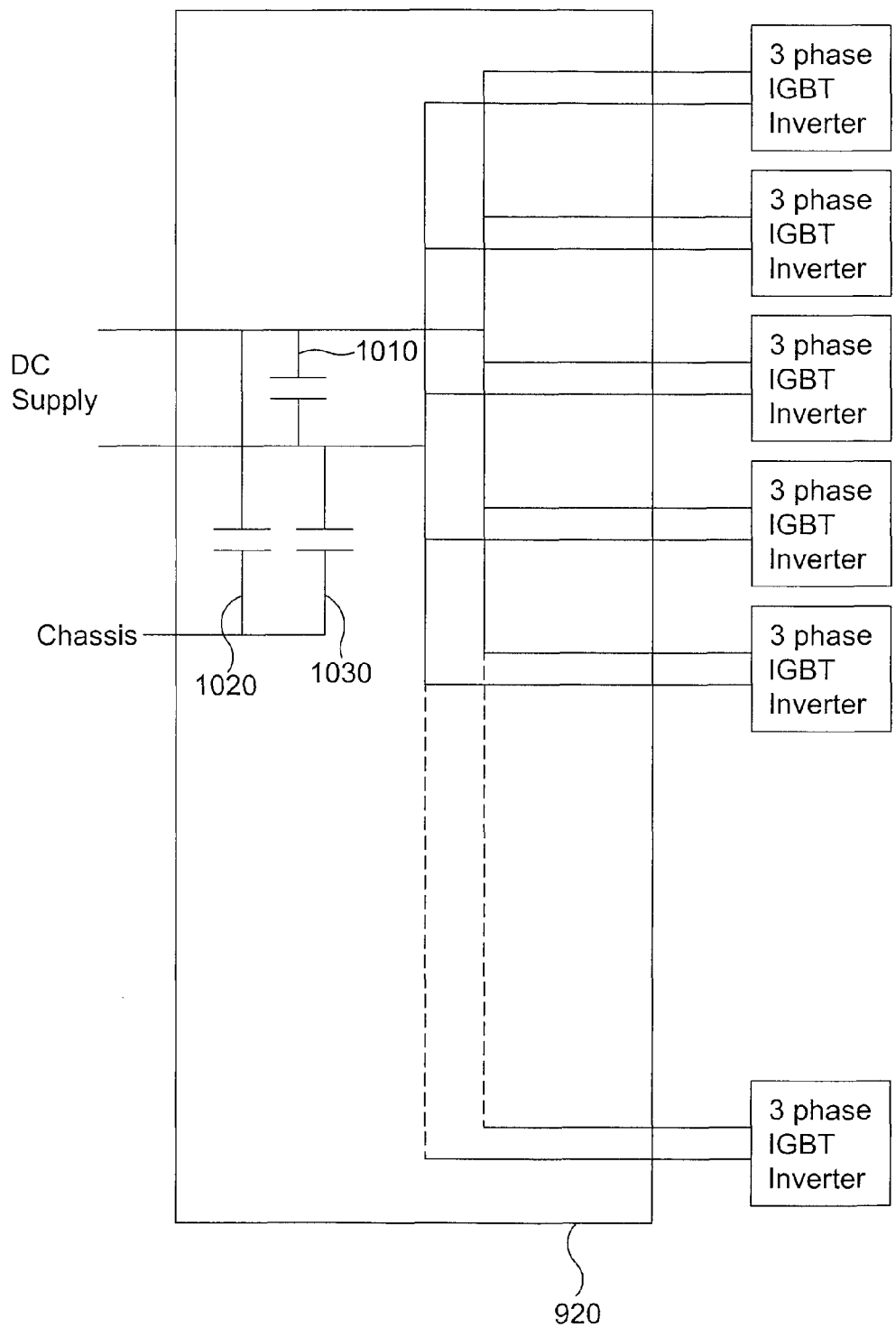
FIG. 10 illustrates a schematic diagram for a capacitor according to an embodiment of the present invention.

FIG. 10 illustrates an equivalent circuit for the integrated annular capacitor component 920 with the first capacitor 1010 being coupled between the positive and negative power rails of the DC voltage source with the second capacitor 1020 being coupled between the positive power rail and a reference potential, for example the vehicle chassis, and the third capacitor 1030 being coupled between the negative power rail and the reference potential. As stated above, the respective inverters are coupled across the positive and negative power rails of the DC voltage source.

By using a single capacitor to support a plurality of inverters the overall capacitance can be reduced, with a reduction in space, as the plurality of inverters will not draw the same current at the same time due to switching, timing and inverter demand variations. A single capacitor can be configured to be close to the plurality of separate inverters when configured as an annular element, thereby reducing inductive effects and removing the need for snubber capacitors.

Figure 11:
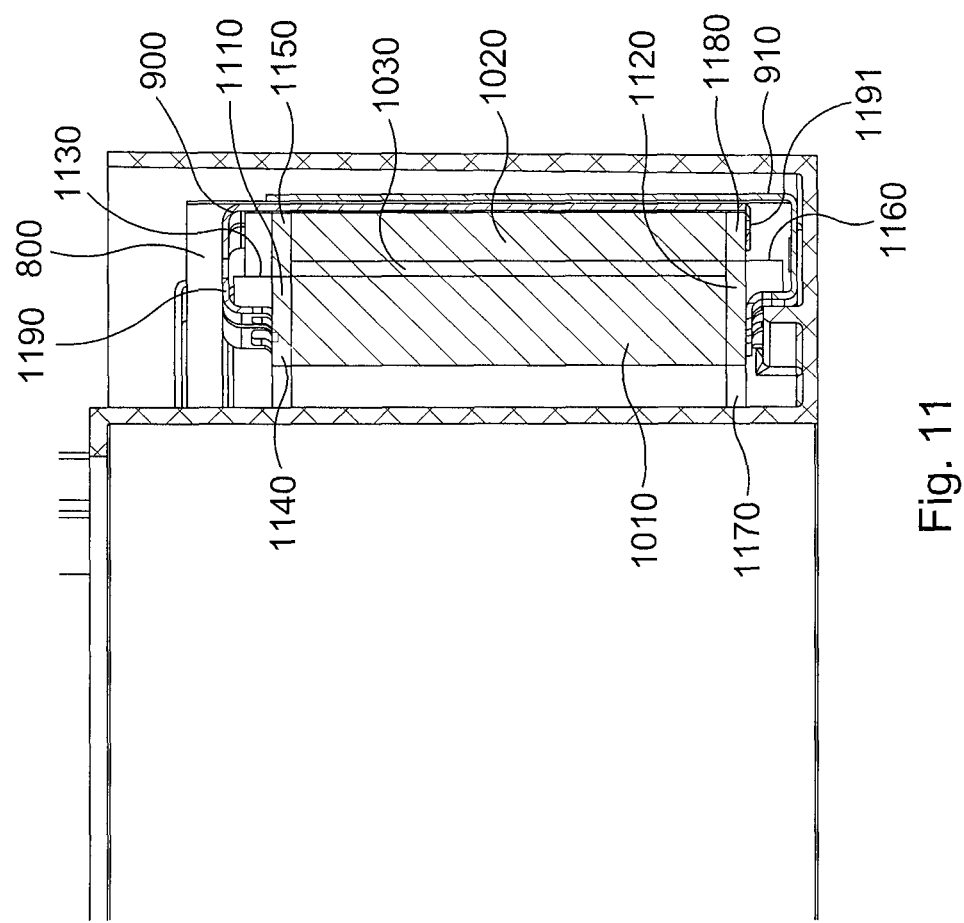
FIG. 11 illustrates a cross sectional view of a capacitor according to an embodiment of the present invention.

FIG. 11 illustrates a cross sectional view of one section of the annular capacitor element 800, including the first busbar 900 and the second busbar 910.

The annular capacitor component 920 includes at least one dielectric film wound to form an annular element, where a plurality of internal electrodes (i.e. the capacitor plates) is formed on the film. The internal electrodes may be formed by any suitable means, however for the purposes of the present embodiment the internal electrodes are formed by creating a metallization layer on the film. In an alternative embodiment a plurality of films may be used with a separate electrode formed on each film. For example, two layers of film each with a metal coating formed on one side of the respective films, which are wrapped round in a cylindrical shape.

To simplify the connections between the respective capacitors that form the annular capacitor component 920, for the purposes of the present embodiment the third capacitor is integrated between the first capacitor and the second capacitor. However, the capacitors can be arranged in any order.

The first capacitor 1010, second capacitor 1020 and third capacitor 1030 may be formed using a single film with an insulating region formed on the film to electrically separate the first capacitor 1010 from the third capacitor 1030 and an insulating region formed on the film to electrically separate the third capacitor 1030 from the second capacitor 1020 (e.g. the metal coating is removed from a portion of the film). However, for the purposes of the present embodiment the first capacitor 1010, the second capacitor 1020 and the third capacitor 1030 are formed on separate films, where the film for the third capacitor 1030 is wound on the first capacitor 1010 and the film for the second capacitor 1020 is wound on the third capacitor 1030 to form a capacitor element having three separate film layers with each separate film layer corresponding to a separate capacitor. For increased electrical isolation between the capacitor elements, preferably a separate insulating film is placed between the first capacitor 1010 and the third capacitor 1030 and between the third capacitor 1030 and the second capacitor 1020.

The dielectric film may be made from any suitable material, for example a polymer film.

The metallization layers formed on the dielectric films that form the internal electrodes of the first capacitor 1010, the second capacitor 1020 and the third capacitor 1030 are arranged to extend to one edge of the dielectric film that is normal to the surface of the film. In particular, a first metallization layer, which forms a first electrode, is arranged to extend to one edge of the dielectric film that is normal to the surface of the film. However, the first metallization layer does not extend to the opposite edge of the dielectric film, thereby leaving an insulated region on the opposite edge of the dielectric film. The corresponding second metallization layer, which forms a second electrode, is arranged to extend to the edge of the dielectric film that is normal to the surface of the film and that is opposite to the edge that the first metallization layer is arranged to extend to. The second metallization layer does not extend to the opposite edge of the dielectric film, thereby leaving an insulated region on the opposite edge of the dielectric film.

Consequently, the edges of the metallization layers are used as the positive and negative plates of the capacitor elements, where the edges of the annular capacitor element that are normal to the surface of the dielectric film are covered by a metal layer to form a first external electrode 1110 and a second external electrode 1120 respectively for the annular capacitor element.

Having a multi-element capacitor with integrated capacitor elements it is necessary that the individual capacitor elements be capable of being isolated from each other to enable specific electrical connections to be made to the respective capacitor terminals.

To achieve electrical isolation between the respective capacitor elements the first external electrode 1110 is divided into two sections, where an insulation layer 1130 divides the first external electrode 1110 at the interface between the first capacitor 1010 and the third capacitor 1030. The insulation layer 1130 takes the form of a first isolation film that is placed between the first capacitor 1010 and the third capacitor 1030 to provide an insulation barrier between the two sections of the first external electrode 1110 to form a radially inner section 1140 and a radially outer section 1150. Preferably, the existing insulating film used within the film capacitor may be used to form this insulation barrier. For improved electrical isolation between the inner radial section 1140 and the outer radial section 1150 of the first external electrode 1110 the first isolation film 1130 is arranged to extend perpendicular away from the surface of the first external electrode 1110, that is to say the insulation film 1130 protrudes above the terminal surface extending the clearance distance, as illustrated in FIG. 11.

The second external electrode 1120 is divided into two sections, where an insulation layer 1160 divides the second external electrode 1120, at the interface between the second capacitor 1020 and the third capacitor 1030. The insulation layer 1160 takes the form of a second isolation film that is placed between the second capacitor 1020 and the third capacitor 1030 to provide an insulation barrier between the two sections of the second external electrode 1120 to form a radially inner section 1170 and a radially outer section 1180. Preferably, the existing insulating film used within the film capacitor may be used to form an insulation barrier. For improved electrical isolation between the inner radial section 1170 and the outer radial section 1180 of the second external electrode 1120 the second isolation film 1160 is arranged to extend perpendicularly away from the surface of the second external electrode 1120, that is to say the insulation film 1160 protrudes above the terminal surface extending the clearance distance, as illustrated in FIG. 11.

By allowing the respective insulation films 1130, 1160 to extend away from the surfaces of the external electrodes 1110, 1120, this allows the busbar connection points to the external electrodes 1110, 1120 of the capacitor element to be placed near to the interface/junction between capacitor elements so that size/width of the annular capacitor element 800 does not need to be increased.

As stated above, mounted around the outer circumferential surface of the annular capacitor component are the first busbar 900 and the second busbar 910, where the first busbar 900 and the second busbar 910 are electrically isolated from each other using an insulation film placed between them.

In the present embodiment, the internal electrodes for the first capacitor 1010, the second capacitor 1020 and the third capacitor 1030 and the first and second busbars 900, 910 are radially symmetrical around an axis.

Figure 12:
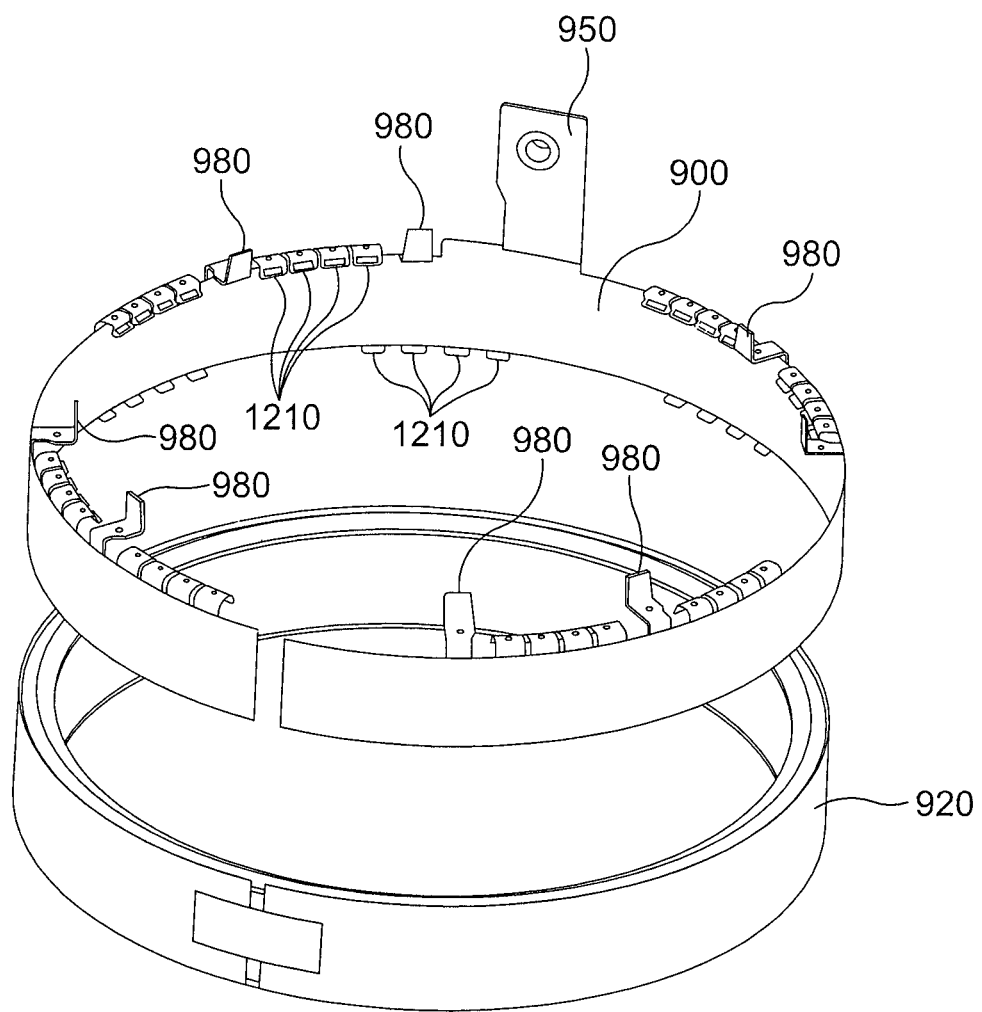
FIG. 12 illustrates a capacitor element according to an embodiment of the present invention.

To allow electrical connections to be made between the first external capacitor electrode 1110, the second external capacitor electrode 1120, the first busbar 900 and the second busbar 910; the first busbar 900 and the second busbar 910 include contact arms for making electrical contact with the first external capacitor electrode 1110 and the second external capacitor electrode 1120. A contact arm 1210 for the first busbar 900 is illustrated in FIG. 12.

The busbar contact arms extend from the main body of the respective busbars 900, 910 in a direction towards the annular capacitor component at substantially 90 degrees to the internal capacitor electrodes. This orientation of the busbar contact arms 1210 allows the busbar contact arms to extend over the respective external capacitor electrodes.

FIG. 11 illustrates the respective electrical connections between the first busbar and the second busbar to the respective capacitors that form the annular capacitor element to provide the equivalent circuit illustrated in FIG. 10.

A first contact arm 1190 formed on one end of the first busbar 900 is coupled to the inner radial portion 1140 of the first external capacitor electrode 1110 with a second contact arm 1191 formed on the opposite end of the first busbar 900 being coupled to the outer radial portion 1180 of the second external capacitor electrode 1120. The first contact arm 1190 is arranged to extend over the insulation film 1130 protruding from between the first capacitor 1010 and the third capacitor 1030.

A second contact arm 1192 formed on one end of the second busbar 910 is coupled to the inner radial portion 1170 of the second external capacitor electrode 1120. The second contact arm 1192 is arranged to extend over the insulation film 1160 protruding from between the third capacitor 1030 and the second capacitor 1020.

The outer radial portion 1150 of the first external capacitor electrode 1110 is arranged to be coupled to a reference potential, for example the vehicle chassis.

Figure 13:
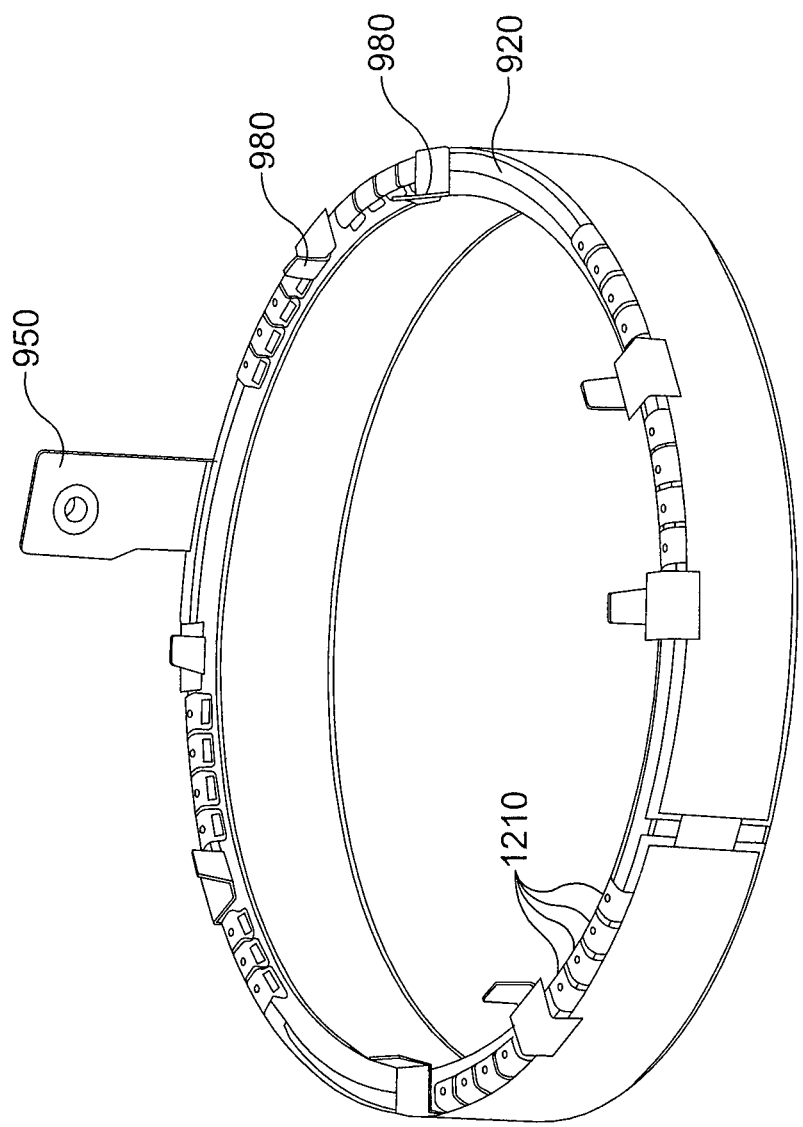
FIG. 13 illustrates a capacitor element according to an embodiment of the present invention.

To minimise the manufacturing cost of the respective busbars 900, 910, the busbars 900, 910 are arranged to have multiple sections of substantially identical contact arms for electrically coupling the busbars 900, 910 to the annular capacitor component 920 and power source coupling members 980 for coupling the busbars 900, 910 to the inverters housed in the respective control modules 400. The multiple sections form a repeating pattern that allows smaller/cheaper tooling to cut out sections of the capacitor busbar repeatedly rather than using a single large tool in a one shot process. The multiple repeating pattern is illustrated in FIG. 12 and FIG. 13.

Additionally, by placing the first busbar 900 and the second busbar 910 around the outer circumference of the annular capacitor component 920, otherwise known as the capacitor ring, in parallel with the first internal capacitor electrode and the second internal capacitor electrode and perpendicular to the first external capacitor electrode 1110 and the second external capacitor electrode 1120 increases the surface area of the capacitor busbars, thereby allowing the thickness of the metal sheets that make up the first busbar 900 and the second busbar 910 to be reduced. This ensures that the axial width of the capacitor ring does not increase while having minimum impact on the diameter of the capacitor ring. Increased surface area of the busbar also results in reduced inductance and temperature of the busbar. Additionally, by increasing the surface area of the busbar allows the cross-sectional thickness of the metal sheets used to manufacture the busbars to be reduced, thereby allowing the metal sheets that make up the busbars to be more easily rolled around the annular capacitor element for ease of manufacturing of the component.

Figure 14:
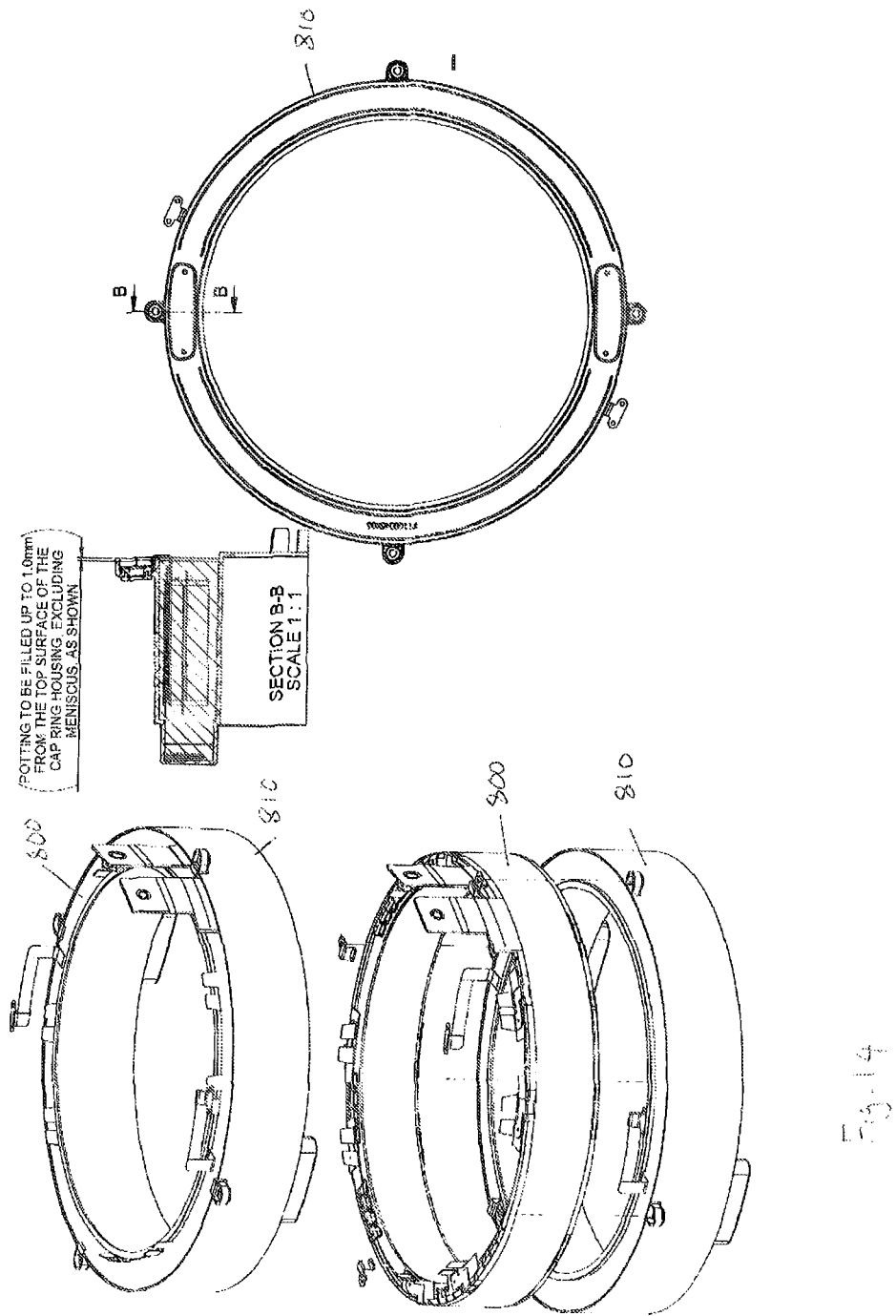
FIG. 14 illustrates a capacitor element according to an embodiment of the present invention.

FIG. 14 illustrates a perspective view of the annular capacitor element 800 mounted within an annular capacitor element housing 810 and an exploded view of the annular capacitor element 800 and the annular capacitor element housing 810.

Figure 15:
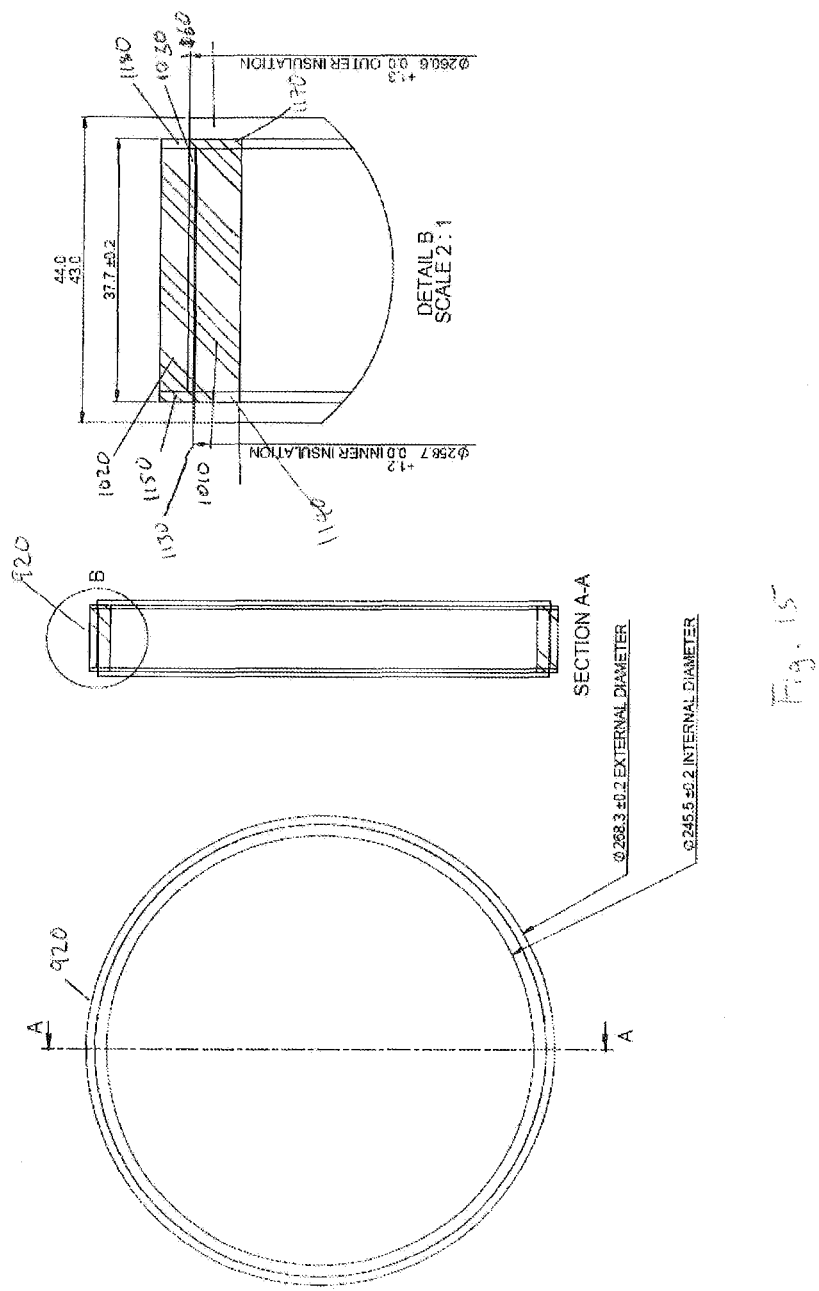
FIG. 15 illustrates a capacitor element according to an embodiment of the present invention.

FIG. 15 illustrates a plan view and a cross sectional view of the annular capacitor component 920.

To allow the respective coil windings for two of the four coil sets 60 to be coupled to a respective phase winding busbar within a control module housing 550, the control module housing 550 is arranged to have six apertures 610.

The six apertures 610 are formed on an outer edge of the control module housing 550 on the side of the housing 550 that is to be mounted adjacent to the planar portion of the stator heat sink 253.

The size and position of the six apertures 610 formed in the control module housing 550 are arranged to match the positions and diameters of the end portions of the coil windings that extend from the planar portion of the stator heat sink 253, thereby allowing the respective end portions of the coil windings to extend through the apertures 610 when the control housing module 550 is mounted on to the planar portion of the stator heat sink 253.

Figure 16:
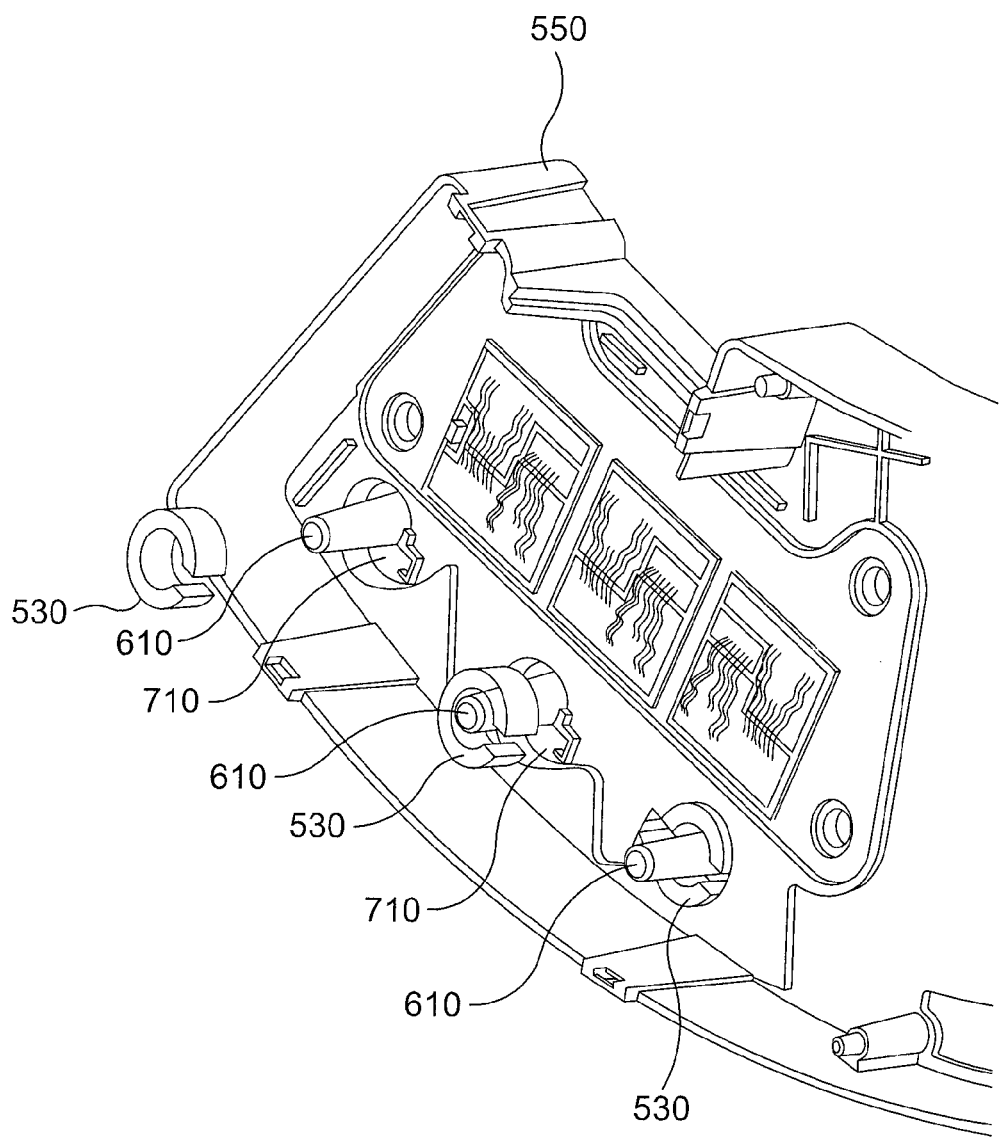
FIG. 16 illustrates a partial view of a control module housing according to an embodiment of the present invention.

A partial perspective view of the control module housing 550 is illustrated in FIG. 16. A recess 710 is formed around each of the six apertures 610 formed in the control module housing 550, where each recess 710 is sized to allow a partial toroid made of soft ferromagnetic material 530, for example a ferrite element, to be located in the recess 710. The top of the partial toroid is arranged to be substantially level with the bottom section of the control module housing 550 when the partial toroid 530 is mounted in a recess 710. The partial toroid of ferromagnetic material 530 has a section missing from the toroid that substantially corresponds to the size of the Hall sensor mounted on the power printed circuit board 500. To facilitate the guiding of the coil windings as they pass through the aperture 610, the control module housing 550 is arranged to have a conduit section formed around each aperture 610. The conduit sections formed around each of the respective apertures also prevent an elastomer placed in the control module housing 550 from escaping through the apertures during the curing process for the elastomer.

Preferably the recesses 710 formed in the base of the control module housing 550 are keyed to ensure that the partial toroids of soft ferromagnetic material 530 can only be oriented within a recess 710 in a position where the missing section of the toroid is aligned with the position of the Hall sensor mounted on the power printed circuit board 500 when the power printed circuit board 500 is mounted within the control module housing 550.

Once the partial toroids of soft ferromagnetic material 530 have been mounted in the respective recesses 710 formed in the base of the control module housing 550, the power printed circuit board 500 is lowered into position in the control module housing. Upon the power printed circuit board 500 being lowered into position in the control module housing 550, as a result of the alignment of the partial toroids of soft ferromagnetic material 530 and the Hall sensors mounted on the power printed circuit board 500, the Hall sensors mounted on the power printed circuit board 500 are inserted into the missing sections of the respective partial toroids 530 mounted in the control module housing 550.

Once the power printed circuit board 500 has been lowered into position in the control module housing the insert modules are positioned over a respective power substrate assembly with the respective inverter formed on the power substrates being coupled to the respective power source busbars and phase winding busbars.

Each of the phase winding busbars formed on the respective insert modules are arranged to include a coupling section for coupling the phase winding busbar to a phase winding of one of the coil sets. The coupling section for each phase winding busbar is arranged to extend around a respective aperture 610 formed in the base of the control module housing 550.

The control printed circuit board 520 is then mounted in the control module housing 550 above the power printed circuit board 500, with the control printed circuit board 520 being electrically coupled to the power printed circuit board 500 to allow the control printed circuit board 520 to control the operation of the switches on the inverters formed on the power substrate assemblies 510.

To mount the control module 400 to the stator, the respective end sections of the coil windings form two coil sets 60 that extend away from the planar surface of the stator heat sink 253 (i.e. six coil winding end sections) are aligned with the respective apertures 610 formed in the base of the control module housing 550. The control module 400 is then pushed flush with the surface of the stator so that the respective end sections of the coil windings for two coil sets 60 that extend away from the planar surface of the stator heat sink 253 (i.e. six coil winding end sections) extend through the respective apertures 610 formed in the base of the control module housing 550 with each of the current sensors mounted in the control module 400 being mounted adjacent to a respective end section of a coil winding.

The control module may be mounted to the stator by any suitable means, for example one or more bolts that extend through the control module into the surface of the stator heat sink.

Once the control module has been mounted to the stator, the respective coupling sections of the phase winding busbars mounted on the power printed circuit board 500 are coupled to a respective end section of a coil winding, where any suitable means may be used to couple the coupling section of the phase winding busbar to a respective end section of a coil winding, for example crimping or welding. Similarly, the respective power source busbars housed in the control modules are coupled to respective coupling members on the first busbar and the second busbar using any suitable means, for example crimping or welding.

The inverter 410 formed on one power assembly 510, which is coupled via the respective phase winding busbars to a first coil set 60, is arranged to control current in the first coil set. The other inverter 410 formed on the other power assembly 510 in the control module 400 is arranged to control current in a second coil set 60, where the current measurements made by the respective current sensors are used by the processor on the control printed circuit board 520 to control current in the respective coil sets 60.

Similarly, the second control module 400 is arranged to control current in a third and fourth coil set 60.

The invention claimed is:

1. An electric motor or generator comprising a stator having two coil sets arranged to produce a magnetic field for generating a drive torque; two control devices; and a capacitor component arranged to be coupled to a power source for providing current to the two control devices, wherein the first control device is coupled to a first coil set and the capacitor component and the second control device is coupled to a second coil set and the capacitor component, wherein each control device is arranged to control current in the respective coil set to generate a magnetic field in the respective coil set, wherein the capacitor component includes a first capacitor integrated with a Y-capacitor, wherein the Y-capacitor includes a second capacitor and a third capacitor, wherein the second and the third capacitor are arranged in series with each other and in parallel to the first capacitor.

2. An electric motor or generator according to claim 1, wherein each coil set includes a plurality of coil sub-sets, wherein the first control device is coupled to the plurality of coil sub-sets for the first coil set and the second control device is coupled to the plurality of coil sub-sets for the second coil set and each control device is arranged to control current in the respective plurality of coil sub-sets to generate a magnetic field in each coil sub-set to have a substantially different magnetic phase to the other one or more coil sub-set in the respective coil set.

3. An electric motor or generator according to claim 2, wherein the first control device and second control device are arranged to drive each of the coil sub-sets with a different voltage phase.

4. An electric motor or generator according to claim 2, wherein the first control device and second control device are arranged to control the voltage to each coil sub-set using pulse width modulation.

5. An electric motor or generator according to claim 1, wherein the first control device, the second control device and the capacitor component are mounted adjacent to the stator.

6. An electric motor or generator according to claim 1, wherein the capacitor component is in the form of an annular disc.

7. An electric motor or generator according to claim 1, wherein the stator includes an annular recess for housing the capacitor component.

8. An electric motor or generator according to claim 7, wherein the first control device and the second control device are mounted on the stator adjacent to the annular recess.

9. An electric motor or generator according to claim 7, wherein the first control device and the second control device are mounted on the stator between the outer radial edge of the stator and the annular recess.

10. An electric motor or generator according to claim 1, wherein the first control device includes a first inverter for controlling current flow in the first coil set and the second control device includes a second inverter for controlling current flow in the second coil set, wherein each inverter is coupled to the first capacitor.

11. An electric motor or generator according to claim 10, wherein the first inverter and the second inverter are mounted at substantially the same distance radially from the capacitor component.

12. An electric motor or generator according to claim 1, wherein the capacitor component includes a first electrical busbar coupled to a first electrical terminal of the first capacitor and a second electrical busbar coupled to a second electrical terminal of the first capacitor.

13. An electric motor or generator according to claim 12, wherein the first electrical busbar has a first contact arrangement for coupling the first inverter to the capacitor component and a second contact arrangement for coupling the second inverter to the capacitor component, wherein the configuration of the first contact arrangement and the second contract arrangement is substantially the same.

14. An electric motor or generator according to claim 12, wherein the second electrical busbar has a first contact arrangement for coupling the first inverter to the capacitor component and a second contact arrangement for coupling the second inverter to the capacitor component, wherein the configuration of the first contact arrangement and the second contract arrangement is substantially the same.

15. An electric motor or generator according to claim 1, wherein the first control device includes a first inverter for controlling current flow in the first coil set and the second control device includes a second inverter for controlling current flow in the second coil set, wherein each inverter is coupled to the first capacitor, wherein the capacitor component includes a first electrical busbar coupled to a first electrical terminal of the first capacitor and a second electrical busbar coupled to a second electrical terminal of the first capacitor, wherein the first inverter and second inverter are coupled to the first electrical busbar and the second electrical busbar.

16. An electric motor or generator according to claim 1, wherein each coil set includes three coil sub-sets.

17. An electric motor or generator according to claim 1, wherein the capacitor component includes a first capacitor.

18. An electric motor or generator according to claim 1, wherein the capacitor component includes a stack of film sheets having a plurality of internal electrodes and dielectric sheets interposed between them that form the first capacitor, the second capacitor and the third capacitor.

19. An electric motor or generator according to claim 18, wherein a first and a second outer surface of the capacitor component that are substantially normal to the plurality of internal electrodes are covered by a metallic coating.

20. An electric motor or generator according to claim 18, wherein a first and a second outer surface of the capacitor component that are substantially normal to the plurality of internal electrodes are covered by a metallic coating, wherein the capacitor component includes a first and a second electrically insulating separator film sheet that seperates the stack of film sheets between the first, the second and the third capacitor, and wherein the first electrically insulating separator film sheet is arranged to seperate the metallic coating on the first outer surface into a first section and a second section that are insulated from each other, and the second electrically insulating separator film sheet is arranged to seperate the metallic coating on the second outer surface into a first section and a second section that are insulated from each other.

21. An electric motor or generator according to claim 1, wherein the capacitor component includes a first and a second electrically insulating separator film sheet that seperates the stack of film sheets between the first, the second and the third capacitor.

22. An electric motor or generator according to claim 1, wherein the first busbar and the second busbar are arranged to electrically couple the first, the second and the third capacitor.

23. An electric motor or generator according to claim 22, wherein the first busbar, the second busbar, the first capacitor, the second capacitor and the third capacitor are formed as a ring that enclose a common axis, whereby each of the first busbar and the second busbar have a diameter that is greater than that of the first, the second and the third capacitor.

24. An electric motor or generator according to claim 1, wherein the capacitor component includes a first electrical busbar coupled to a first electrical terminal of the first capacitor and a second electrical busbar coupled to a second electrical terminal of the first capacitor, wherein the capacitor component includes a first and a second electrically insulating separator film sheet that seperates the stack of film sheets between the first, the second and the third capacitor, and wherein the first busbar is electrically connected to the first section on the first outer surface, and the second busbar is connected to the first section on the second outer surface and to the second section on the first outer surface, and in which the second section of the second outer surface is connected to a reference potential.

* * * * *